US012660827B2

(12) United States Patent
Barenberg et al.

(10) Patent No.: US 12,660,827 B2
(45) Date of Patent: Jun. 23, 2026

(54) MOISTURE-ACTIVATED CHLORINE DIOXIDE-RELEASING POWDER AND METHOD OF MANUFACTURE

(71) Applicants: Sumner Barenberg, Boston, MA (US); Robert Cameron, Boalsburg, PA (US); Xiao Tian, Wilmington, DE (US)

(72) Inventors: Sumner Barenberg, Boston, MA (US); Robert Cameron, Boalsburg, PA (US); Xiao Tian, Wilmington, DE (US)

(73) Assignee: Phiex Technologies, Inc., Boston, MA (US)

( * ) Notice: Subject to any disclaimer, the term of this patent is extended or adjusted under 35 U.S.C. 154(b) by 532 days.

(21) Appl. No.: 17/882,280

(22) Filed: Aug. 5, 2022

(65) Prior Publication Data

US 2024/0041044 A1     Feb. 8, 2024

(51) Int. Cl.
*A01N 59/00*        (2006.01)
*A01N 25/08*        (2006.01)
*A01N 25/14*        (2006.01)

(52) U.S. Cl.
CPC ............. *A01N 59/00* (2013.01); *A01N 25/08* (2013.01); *A01N 25/14* (2013.01)

(58) Field of Classification Search
CPC ........ A01N 59/00; A01N 25/08; A01N 59/04; A01N 25/12; A01P 1/00; A61L 2/20; A61K 9/1611
See application file for complete search history.

(56) References Cited

U.S. PATENT DOCUMENTS

| | | | |
|---|---|---|---|
| 3,591,515 A | 7/1971 | Lovely | |
| 4,689,169 A | 8/1987 | Mason et al. | |
| 5,695,814 A | 12/1997 | Wellinghoff et al. | |
| 5,888,528 A | 3/1999 | Wellinghoff et al. | |
| 6,277,408 B1 | 8/2001 | Wellinghoff et al. | |
| 6,605,304 B1 | 8/2003 | Wellinghoff et al. | |
| 6,767,509 B1 | 7/2004 | Griesbach et al. | |
| 7,273,567 B1 | 9/2007 | Wellinghoff et al. | |
| 7,449,194 B2 | 11/2008 | Lelah et al. | |
| 9,533,272 B2 | 1/2017 | Ozawa et al. | |
| 10,112,831 B2 | 10/2018 | Ozawa et al. | |
| 11,071,801 B2 | 7/2021 | Abbott et al. | |
| 11,224,671 B2 | 1/2022 | Abbott et al. | |
| 2001/0006668 A1 | 7/2001 | Brown | |
| 2004/0151778 A1 | 8/2004 | Richard et al. | |
| 2008/0026029 A1 | 1/2008 | Wellinghoff et al. | |
| 2011/0052726 A1 | 3/2011 | Smith et al. | |
| 2014/0311094 A1 | 10/2014 | Thompson et al. | |

| | | | |
|---|---|---|---|
| 2017/0157904 A1 | 6/2017 | Abbott et al. | |
| 2018/0235246 A1 | 8/2018 | Abbott et al. | |
| 2018/0243456 A1 | 8/2018 | Abbott et al. | |
| 2019/0282516 A1 | 9/2019 | Hayashi | |
| 2021/0002515 A1 | 1/2021 | Jain et al. | |

FOREIGN PATENT DOCUMENTS

| | | | | |
|---|---|---|---|---|
| KR | 20140034530 A | * | 3/2014 | |
| WO | 2010045280 A2 | | 4/2010 | |
| WO | 2017/031351 A1 | | 2/2017 | |
| WO | WO-2020261030 A1 | * | 12/2020 | ............. A01N 25/14 |
| WO | WO-2021034592 A1 | * | 2/2021 | ............... B01J 2/04 |
| WO | 2021/137862 A1 | | 7/2021 | |

OTHER PUBLICATIONS

English translation of KR 20140034530A (Year: 2025).*
International Preliminary Report on Patentability for PCT/US2022/025211, mailed Aug. 27, 2024, 5 pages.
Abbasi, R., et al., "Polymeric Films Containing Sodium Chlorite That Release Disinfectant Gas Upon Activation with UV Light," Advanced Functional Materials, 2019, pp. 1-8, vol. 29, No. 7, Article 1804851.
International Search Report and Written Opinion issued for PCT/US2022/025211 mailed Jun. 29, 2022, 8 pages.
Jain, R., "Characterization and Design of Biotic/Abiotic Interfaces," A dissertation submitted in partial fulfillment of the requirements for the degree of Doctor of Philosophy (Chemical Engineering) at the University of Wisconsin-Madison, 2014, 267 pages.
Jain, R., et al., "Using Chemoattractants to Lure Bacteria to Contact-Killing Surfaces," Angewandte Chemie (Internatonal Edition in English), 2016, pp. 5698-5702, vol. 55, No. 19.
Jain, R., et al., "Generation of Gaseous ClO2 from Thin Films of Solid NaClO2 by Sequential Exposure to Ultraviolet Light and Moisture," American Chemical Society Applied Materials & Interfaces, 2017, pp. 16594-16603, vol. 9, No. 19.
International Search Report and Written Opinion in PCT/US2023/029528, mailed Nov. 8, 2023, 17 pages.
Sigma Aldrich: Sodium Chlorite, 1 pg., 2022.
Delcomyn et al., Environ Sci Technol, 2006, 40, 2759-2764.
International Preliminary Report on Patentability for PCT/US23/029528 dated Feb. 4, 2025.

* cited by examiner

*Primary Examiner* — Anna R Falkowitz
*Assistant Examiner* — John P Nguyen
(74) *Attorney, Agent, or Firm* — Lewis Rice LLC

(57) ABSTRACT

Methods of manufacturing a moisture-activated powder are provided which provide generation and release of chlorine dioxide without detectable amounts of any toxic by-products such as chlorine gas, chlorites, or chlorates. The powder need not be exposed to light before or during exposure of the powder to moisture or relative humidity to generate the gas. The powder can also be prepared under conditions that minimize or prevent decomposition or oxidation of sodium chlorite or premature moisture activation of the powder during the manufacturing process to maximize its activity.

17 Claims, No Drawings

MOISTURE-ACTIVATED CHLORINE DIOXIDE-RELEASING POWDER AND METHOD OF MANUFACTURE

CROSS REFERENCE TO RELATED APPLICATIONS

Not applicable

GOVERNMENT LICENSE RIGHTS

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

Moisture-activated powders and methods for their manufacture are provided for use in generating and releasing chlorine dioxide. More specifically, moisture-activated, controlled-release powders are provided which are capable of generation and release of chlorine dioxide without detectable amounts of any toxic by-products and which are prepared by methods to provide a powder and maximize the controlled-release powder's activity for use in disinfection, sanitation, sterilization, and control of biological or pathogenic contamination

BACKGROUND OF THE INVENTION

Currently, ethylene oxide is used in the sterilization of medical devices and other products. Ethylene oxide is recognized by the U.S. Food and Drug Administration to have potential adverse impacts on the environment and on public health. The FDA is encouraging changes to ethylene oxide sterilization processes and facilities that will reduce the amount of ethylene oxide on medical devices.

Detectable amounts of toxic by-products including chlorine gas, chlorates and/or chlorites have been observed when chlorine dioxide is generated from some conventional chlorine dioxide-generating products.

SUMMARY OF THE INVENTION

One option for reducing the concentration of ethylene oxide on medical devices is to replace ethylene oxide entirely with a different gas manufactured by a process having less impact on the environment and public health.

In a first aspect of the invention, a method is provided for making a moisture-activated powder for providing controlled release of chlorine dioxide. The method comprises admixing sodium chlorite, a silicate, and water to form an aqueous suspension, and spray-drying the aqueous suspension at an inlet temperature ranging from about 482 to about 537° C. (900 to 1000° F.) and an outlet temperature of not more than 143° C. (290° F.) to form silicate particles. An inorganic acid-releasing agent, an anhydrous material, and water are admixed to form a colloidal suspension. The silicate particles is admixed with the colloidal suspension to form a slurry. The slurry is spray-dried at an inlet temperature ranging from about 482 to about 537° C. (900 to 1000° F.) and an outlet temperature of not more than 143° C. (290° F.) to form the powder. The powder is substantially free of water and capable of generating and releasing chlorine dioxide in an amount effective for disinfection, without release of detectable amounts of chlorine gas, chlorates and/or chlorites, after hydrolysis of the acid releasing agent and reaction of hydronium ions with chlorite.

The powder prepared by this method is capable of generating the controlled release of the chlorine dioxide from the powder without exposing the powder to light before or during the exposure of the powder to moisture or relative humidity.

The aqueous suspension may include sodium chlorite of 85-99% purity.

A moisture-activated powder is provided as a second aspect of the invention. The moisture-activated powder is prepared by the methods described in the first aspect of the invention and in the examples. The powder, when exposed to moisture or relative humidity, is capable of generating the controlled release of chlorine dioxide from the powder in an amount effective for disinfection, sanitation, sterilization without release of detectable amounts of toxic by-products, such as chlorine gas and/or chlorites, chlorates.

Other objects and features will be in part apparent and in part pointed out hereinafter.

BRIEF DESCRIPTION OF THE DRAWINGS

Not applicable.

DESCRIPTION OF THE PREFERRED EMBODIMENTS

Methods of manufacturing a moisture-activated powder have been discovered which provide generation and release of chlorine dioxide without detectable amounts of any toxic by-products such as chlorine gas, chlorates and/or chlorites. The methods include inlet spray-drying temperatures much greater than the 180° C. decomposition temperature for sodium chlorite. The powder, when exposed to moisture or relative humidity, is capable of generating and releasing the gas after hydrolysis of an acid releasing agent in the powder which provides hydronium ions to react with sodium chlorite.

The powder can be prepared under conditions that minimize or prevent decomposition or oxidation of sodium chlorite or premature moisture or relative humidity activation of the powder during the manufacturing process to maximize its activity.

As a first aspect of the invention, a method is provided for making a moisture-activated powder for providing controlled release of chlorine dioxide The method comprises admixing sodium chlorite, a silicate, and water to form an aqueous suspension, and spray-drying the aqueous suspension at an inlet temperature ranging from about 482 to about 537° C. (900 to 1000° F.) and an outlet temperature of not more than 143° C. (290° F.) to form silicate particles. An inorganic acid-releasing agent, an anhydrous material, and water are admixed to form a colloidal suspension. The silicate particles are admixed with the colloidal suspension to form a slurry. The slurry is spray-dried at an inlet temperature ranging from about 482 to about 537° C. (900 to 1000° F.) and an outlet temperature of not more than 143° C. (290° F.) to form the powder. The powder is substantially free of water and capable of generating and releasing chlorine dioxide in an amount effective for disinfection, without release of detectable amounts of chlorine gas, chlorates and/or chlorites, after hydrolysis of the acid releasing agent and reaction of hydronium ions with chlorite.

The powder can have a core comprising a silicate particle(s) and a shell comprising the inorganic acid-releasing agent and the anhydrous material.

The formation of chlorate and chlorite anions reduces the amount of chlorine dioxide that can be generated by a powder containing the silicate particles because these anions do not generate chlorine dioxide efficiently in the presence of an acid or hydronium ions. The silicate particles can be processed at temperatures up to 537° C. (1000° F.) for a period of time without significantly reducing the amount of gas that can be generated from a powder containing the particles. Without being bound by a particular theory of the invention, it is believed that the anions that are capable of reacting with hydronium ions to form a gas are dispersed within an amorphous silicate matrix which encapsulates the anions. Disproportionation of chlorite is avoided because intermolecular interactions between the chlorite anions are minimized in the amorphous silicate matrix.

Preferably, each silicate particle comprises from about 85 wt. % to about 99 wt. % silicate and about 1 wt. % to about 15 wt. % chlorite. More preferably, the silicate particle comprises from about 95 wt. % to about 99 wt. % silicate and about 1 wt. % to about 5 wt. % chlorite.

The silicate particle is substantially free of water to minimize diffusion of chlorite into solution when further processing the particle, such as when the particles are added to an aqueous slurry containing an acid releasing agent to form a powder. For purposes of the present invention, the silicate particle is substantially free of water if the amount of water in the silicate particle does not provide a pathway for transmission of anions from the particle into a solvent. Preferably, each of the silicate particles includes up to about 10 wt. %, preferably up to about 5 wt. % water without providing such a pathway for diffusion from the particle to the solvent.

The aqueous suspension can include sodium chlorite of 85-99% purity, which is commercially available.

When exposed to ambient moisture, relative humidity or otherwise contacted with water, the powder is capable of generating the controlled release of chlorine dioxide from the powder. The moisture or water diffuses into the powder, and reacts with the inorganic acid releasing agent to form an acid. The acid dissolves in the water forming hydronium ions and a counterion. The hydronium ions diffuse into the silicate particle where they react with chlorite anions to form chlorine dioxide.

The gas diffuses out of the powder into the surrounding atmosphere for a period of up to about six months to affect materials situated near the powder. Powders that release at least about $1.0 \times 10^{-6}$ gram gas/cm$^3$ for a period of at least one hour, one day, one week, one month or six months can be formulated by the processes of the present invention for a variety of end uses.

The powder prepared by this method is capable of generating the controlled release of the chlorine dioxide from the powder regardless of whether the powder is exposed to light before or during the exposure of the powder to moisture or relative humidity.

The relative humidity during the steps of the methods of the invention is preferably maintained at or below about 60%, and more preferably at or below about 30%.

The silicate of the aqueous suspension used in preparing the silicate particles can include, but is not limited to, sodium silicate, sodium metasilicate, sodium sesquisilicate, sodium orthosilicate, a borosilicate, an aluminosilicate, or any combination thereof. Commercially available forms of such silicates suitable for use generally include sodium and potassium cations.

The ratio of silicon measured as SiO$_2$ to alkali metal cation measured as M$_2$O in the silicate particles, wherein M is selected from the group consisting of sodium and potassium, is between about 2.5 and about 3.5, preferably between about 3.0 and about 3.5, most preferably about 3.2.

The silicate particles are either solid or hollow, and can be substantially spherical.

Inorganic acid releasing agents, such as polyphosphates form odorless powders having greater gas release efficiency as compared to powders containing an organic acid releasing agent. Suitable inorganic acid releasing agents include tetraalkyl ammonium polyphosphates, monobasic potassium phosphate (KH$_2$PO$_4$), potassium polymetaphosphate ((KPO$_3$)$_x$ wherein x ranges from 3 to 50), a sodium metaphosphate, a borophosphate, an aluminophosphate, a silicophosphate, sodium polyphosphates such as sodium tripolyphosphate, potassium tripolyphosphate (K$_5$P$_3$O$_{10}$), sodium-potassium phosphate (NaKHPO$_4$·7H$_2$O), and salts containing hydrolyzable metal cations such as zinc. Preferred sodium metaphosphates have the formula (NaPO$_3$)$_n$ wherein n is 3 to 10 for cyclic molecules and n is 3 to 50 for polyphosphate chains.

The anhydrous material used in the methods is capable of binding with water. The material acts as a moisture scavenger to minimize premature hydrolysis of the acid releasing agent. Suitable anhydrous materials include sodium sulfate, calcium sulfate, calcium carbonate, magnesium sulfate, calcium chloride, a moisture-depleted silica gel, alumina, a zeolite, a clay such as bentonite or kaolin, potassium permanganate, a molecular sieve, an oxygen-scavenging material, or a mixture thereof. The anhydrous materials are commercially available from numerous sources.

In preparing the aqueous suspension in the methods of the invention, a dispersant can be admixed with the silicate, the sodium chlorite and the water. The dispersant can reduce agglomeration within the suspension.

In preparing the colloidal suspension or the slurry in the methods of the invention, a dispersant can be admixed with the inorganic acid-releasing agent, the anhydrous material, and the water, or with the colloidal suspension and the silicate particles. The dispersant can reduce agglomeration within the colloidal suspension or the slurry.

The dispersant can be any substance that minimizes agglomeration of the silicate particles during preparation of the powder, controls release of the gas from the powder, lowers the surface reactivity of the silicate particle, controls moisture penetration through the silicate particle, and does not react with the silicate particle. Substances having hydrophilic and hydrophobic portions are preferred. The hydrophilic portion of the substance can be absorbed by the surface of the silicate particle. The hydrophobic portion of the substance minimizes agglomeration of the silicate particles when the particles are mixed. Suitable dispersants include, but are not limited to, amides of carboxylates such as amide isostearates, polyvinyl acetates, polyvinyl alcohols, polyvinylpyrrolidone copolymers, polymers of alkylene oxides such as polyglycols, polyols, polyalkylene glycols (e.g., polyethylene glycols, polypropylene glycols, polybutylene glycols), alkoxypolyalkylene glycols such as methoxypolyethylene glycols, trifunctional polyethylene glycols, poly(ethylene-propylene)glycols, metallic, oligomeric or copolymeric olefinic carboxylic acids and/or fatty acids, polyethers, and metal carboxylates such as zinc isostearate, and derivatives (e.g., carboxylic acids such as fatty acids), blends and copolymers thereof, or any combination thereof. Some acid releasing agents, such as sodium polyphosphate, also act as a dispersant. Suitable polyvinylpyrrolidone copolymers include copolymers of polyvinylpyrrolidone and hexadecane such as Ganex V-216, and copolymers of polyvinylpyrrolidone and eicosene such as Ganex V-220, which are commercially available from GAF Corp.

The dispersant can comprise a nonionic surfactant. Examples of nonionic surfactants include, but are not limited to, secondary alcohol ethoxylate, an alkylphenol ethoxylate, an alkyl ethoxylate, an alkyl aryl ethoxylate, a polyethylene oxide-polypropylene oxide block copolymer, a polyethylene glycol ether of a linear alcohol, a reaction product of a fatty acid with ethylene oxide and/or propylene oxide, polyvinyl alcohol, polyvinylpyrrolidone, a copolymer of polyvinyl alcohol and polyvinylpyrrolidone, a copolymer of (meth)acrylic acid and (meth)acrylic acid ester, or a combination thereof.

It is also preferred to maintain the aqueous suspension at a basic pH of from about 9 to about 14, preferably from about 11 to about 13. The pH can be maintained by adjusting the concentration of a base added in forming the aqueous suspension.

It is also preferred to maintain the colloidal suspension at a pH of from about 5 to about 7.

The silicate particles optionally contain a base or a filler. The base controls release of chlorine dioxide gas from the particle by reacting with hydronium ions that diffuse into the particle from an acid releasing agent or interdiffuse into the anion-rich areas of the particle to form a salt. When the base is depleted, excess hydronium ions then react with the chlorite anions within the particle to form the gas. The filler controls release of chlorine dioxide gas by creating a barrier to diffusion of hydronium ions. The amount of base or filler within the core can be adjusted to alter the time period before gas is released from the particle. For example, the concentration of the base or filler can be increased if a longer delay of gas release is desired. A base or filler can stabilize the chlorite during preparation of the silicate particles or the powder containing the particles. The amount of base within the particles can be adjusted to alter the time period of gas release and enhance thermal stability. Up to about 50 wt. % of a base based upon the total weight of the particles may be included.

Any base that reacts with a hydronium ion or any filler can be incorporated in the silicate particle or the powder. Suitable bases or fillers include, but are not limited to, an alkali metal bicarbonate such as lithium, sodium, or potassium bicarbonate, an alkali metal carbonate such as lithium, sodium or potassium carbonate, an alkaline-earth metal bicarbonate, an alkaline-earth metal carbonate such as magnesium or calcium carbonate, a bicarbonate salt of a transition metal ion, a protonated primary, secondary or tertiary amine, or a quaternary amine such as ammonium bicarbonate, a carbonate salt of a transition metal ion, a protonated primary, secondary or tertiary amine, or a quaternary amine, an alkali metal hydroxide such as lithium, sodium or potassium hydroxide, an alkaline-earth metal hydroxide such as calcium or magnesium hydroxide, a hydroxide salt of a transition metal ion, a protonated primary, secondary or tertiary amine, or a quaternary amine such as ammonium hydroxide, an alkali metal phosphate such as dibasic or tribasic phosphate salts, an alkaline-earth metal phosphate such as bicalcium or tricalcium phosphate, a phosphate salt of a transition metal ion, a protonated primary, secondary or tertiary amine, or a quaternary amine, an alkali metal sulfate such as sodium or potassium sulfate, an alkaline-earth metal sulfate such as calcium or magnesium sulfate, a sulfate salt of a transition metal ion, a protonated primary, secondary or tertiary amine, or a quaternary amine such as ammonium sulfate, an alkali metal sulfonate such as sodium sulfonate, an alkaline-earth metal sulfonate, or a sulfonate salt of a transition metal ion, a protonated primary, secondary or tertiary amine, or a quaternary amine, an alkali metal borate such as borax, an alkaline-earth metal borate such as magnesium orthoborate, or a borate salt of a transition metal ion, a protonated primary, secondary or tertiary amine, or a quaternary amine.

Preferred bases include, but are not limited to, an alkali metal hydroxide such as lithium, sodium or potassium hydroxide, an alkaline-earth metal hydroxide such as calcium or magnesium hydroxide, a hydroxide salt of a transition metal ion, a protonated primary, secondary or tertiary amine, or a quaternary amine such as ammonium hydroxide. Sodium hydroxide is preferred.

In the methods of the invention, the aqueous suspension can be an azeotrope. When the aqueous suspension is an azeotrope, the spray drying inlet temperature can be as great as 537° C. (1000° F.) yet still avoid sodium chlorite decomposition. The azeotrope can comprise a mixture of solvents including, but not limited to, acetone, acetonitrile, acrylonitrile, an alcohol (e.g., ethanol, methanol, isopropanol, tert-butanol), an alkenol, an alkane (e.g., hexane, 2-methylpentane), an alkenal, a haloalkane (e.g., dichloromethane, trichlorotrifluoroethane), a nitroalkane (e.g., nitromethane), aniline, a cycloalkane (e.g., cyclopentane, cyclohexane), benzene, an alkylbenzene, a halobenzene, carbon disulfide, carbon tetrachloride, chloroform, epichlorohydrin, an alkylamine, a dialkylamine, an alkyl halide (e.g., methyl iodide, ethyl iodide), an alkyl ether (e.g., isopropyl ether), an alkyl acetate (e.g., methyl acetate), a haloalkene, an alkenyl chloride, trifluoroacetic acid, toluene, xylene, or any combination thereof.

For example, the aqueous suspension can include an azeotrope comprising acetone and one or more solvents comprising ethanol, methanol, isopropanol, tert-butanol, hexane, 2-methylpentane, dichloromethane, trichlorotrifluoroethane, nitromethane, cyclopentane, cyclohexane, carbon disulfide, carbon tetrachloride, chloroform, methyl iodide, ethyl iodide, isopropyl ether, methyl acetate, or trifluoroacetic acid.

It is preferred that the silicate particles are formed from an aqueous suspension containing sodium silicate and sodium chlorite. The anhydrous material is preferably magnesium sulfate. The inorganic acid releasing agent is preferably a polyphosphate such as sodium hexametaphosphate.

The sodium silicate and other ingredients used in the methods of the invention can be manufactured by conventional processes and packaged in dry sealed containers, or can be purchased from various sources. The ingredients are stored in a dry atmosphere before being used in the powder preparation process.

An inert atmosphere can be used during the method, such as a nitrogen blanket. An inert atmosphere can be present during the entire method, or during the admixing step, the spray-drying step, in collecting the spray-dried product, and/or in storing the spray-dried product.

The aqueous suspension can be prepared by admixing its ingredients in any order of addition. For example, sodium chlorite can be mixed with water and a silicate to form the aqueous suspension, and optionally solvents may be added to the suspension to form an azeotrope. Alternatively, the silicate and sodium chlorite can be mixed before being admixed with water to form the aqueous suspension. When preparing a suspension, ultrasonic mixing, high-shear mixing, or any conventional homogenizing method can be used.

Once the aqueous suspension is formed, it can be spray dried to form silicate particles by any method known in the art including, for example, any known atomization methods such as nozzles or rotary discs. Typically, the inlet temperature and outlet temperature are maintained at about 482 to about 537° C. (900 to 1000° F.) and outlet temperature ranging from about 121° C. (250° F.) to about 143° C. (290° F.), respectively. The spray drying process generally occurs rapidly (e.g., within up to about 60 seconds). If desired, the silicate particles may then be further dried by any conventional method. The silicate particles are stored in a dry atmosphere.

While not being limited thereto, it is believed that spray drying of the aqueous suspension forms a solid or hollow sphere composed of a solid solution, such as a substantially amorphous silicate matrix, in which the anions are uniformly dispersed and encapsulated. Such uniform dispersion and encapsulation enhances the thermal stability of the silicate particles and a powder containing the silicate particles. Powders containing the silicate particles are believed to release significantly more gas than powders containing crystalline cores. Gas release efficiencies of 75-100% are typical of the powders of the invention.

The wall thickness of a hollow particle can be altered by changing the process conditions, such as the feed rate, residence time, air flow rate, air temperature, flow direction in the dryer, or the type of nozzle or atomizer used in the spray drying process, or by changing the composition of the feed materials, such as the particle size, solids concentration, viscosity, surface tension or temperature of the feed solution.

The crystallinity of the silicate particles is altered by changing the silicate used in preparing the particles.

When preparing the colloidal suspension, its ingredients can be admixed in any order of addition. Ultrasonic mixing, high-shear mixing, or any conventional homogenizing method can be used.

Once the colloidal suspension comprising the inorganic acid-releasing agent, the anhydrous material, and water is formed, it can be spray dried to form a powder by any method known in the art including, for example, any known atomization methods such as nozzles or rotary discs. Typically, the inlet temperature and outlet temperature are maintained at about 482 to about 537° C. (900 to 1000° F.) and outlet temperature ranging from about 121° C. (250° F.) to about 143° C. (290° F.), respectively. The spray drying process generally occurs rapidly (e.g., within up to about 60 seconds). If desired, the powder may then be further dried by any conventional method. The powder is stored in a dry atmosphere.

After spray drying to form the powder, the powder can be admixed with a desiccant to protect the powder further from moisture activation. The desiccant can include, but is not limited to, a silica, a silicate such as sodium silicate, sodium metasilicate, sodium sesquisilicate, sodium orthosilicate, a borosilicate, an aluminosilicate, a zeolite, sodium sulfide, or a combination thereof.

The powder can then be packaged in a container that is impermeable to moisture or relative humidity.

The powder manufactured by the methods of the invention can comprise: from about 30 wt. % to about 80 wt. % of the anhydrous material, about 10 wt. % to about 50 wt. % of the inorganic acid-releasing agent, about 5 wt. % to about 40 wt. % of the silicate, and about 0.01 wt. % to about 50 wt. % sodium chlorite; or from about 35 wt. % to about 70 wt. % of the anhydrous material, about 15 wt. % to about 45 wt. % of the inorganic acid-releasing agent, about 10 wt. % to about 35 wt. % of the silicate, and about 1 wt. % to about 30 wt. % sodium chlorite; or from about 40 wt. % to about 60 wt. % of the anhydrous material, about 20 wt. % to about 40 wt. % of the inorganic acid-releasing agent, about 15 wt. % to about 30 wt. % of the silicate, and about 0.5 wt. % to about 5 wt. % sodium chlorite.

The rate of chlorine dioxide release that is effective for disinfection can range, for example, from about 0.08 ppm/minute to about 50 ppm/minute over a period of about 2 to about 72 hours. The release rate can be increased by increasing the amount of chlorite in the powder, for example, to achieve release rates of 100 ppm/minute, 200 ppm/minute, or more over a period of about 2 to about 72 hours, or longer.

As a second aspect of the invention, a moisture-activated powder is provided. The moisture-activated powder is prepared by the methods described in the first aspect of the invention and in the examples. The powder, when exposed to moisture or relative humidity, is capable of generating the controlled release of chlorine dioxide from the powder in an amount effective for disinfection, without release of detectable amounts of chlorine gas and/or chlorite, chlorate.

Applications for the powders are numerous. They can be used in most any environment where exposure to moisture or relative humidity can occur. The powders can be formed into solids by molding or sintering. The powders can also be impregnated, melt processed, sintered, blended with other powders, or otherwise incorporated into a variety of materials to provide films, fibers, coatings, tablets, resins, polymers, plastics, tubing, membranes, engineered materials, paints, coatings and adhesives for a wide range of end use applications. The powders are particularly useful in preparing any injection-molded products, compression-molded products, thermal-formed (thermo-formed) products, or extrusion-formed products such as cast or blown films. The thermal stability of the powders allows for their use in injection molding processes.

The powders of the invention are preferably incorporated into injection-molded, compression-molded, thermal-formed, or extrusion-formed plastic products by compounding and pelletizing the powder via conventional means and admixing the pellets with a material before the conventional forming or molding process. Suitable materials for forming these products include any polymer, multicomponent polymer such as a copolymer, a terpolymer or an oligomer, and polymer alloys or blends thereof or any wax. Representative polymers include polyolefins such as polyethylene and polypropylene, polyethylene terephthalate, polyvinyl chloride, polyurethanes, metallocene polymers, polyesters, polyacrylic esters, acrylic, polystyrene, polycarbonates, polyamides, polyester amides, ethylene-vinyl acetate copolymers, ethylene-methacrylate copolymers, and polyacetals. Suitable waxes include microcrystalline wax, paraffin wax, and synthetic wax such as chlorinated wax, polyethylene wax, polyethylene glycols and polypropylene glycols. Preferably, the polymer is biodegradable.

The formed or molded products preferably include between about 0.1 and about 70 wt. % of the powder of the invention and between about 30 and about 99.9 wt. % of the material, and more preferably, between about 1 and about 50 wt. % of the powder of the invention and between about 50 and about 99 wt. % of the material, and most preferably, between about 2 and about 50 wt. % of the powder of the invention and between about 50 and about 98 wt. % of the material.

The formed or molded products can be made by any conventional polymer processing method. For example, a powder or powder pellets of the invention and the material can be mixed together in a mixer, such as a Henschel mixer, and fed to an extruder or molding apparatus operated at a temperature not exceeding about 200° C. to form a melt. The melt can be cast-extruded as a film, formed into pellets using dry air cooling on a vibrating conveyer, or formed into a desired shape by conventional injection-molding, thermo-forming, or compression-molding methods.

The melt can be applied on a surface as a film by using well-known hot melt, dip coat, spray coat, curtain coat, dry wax, wet wax, and lamination processes. When the powder is in small particle form (e.g., 5 to 20 micron diameter), a transparent film may be formed.

Conventional film forming additives can be added to the materials as needed. Such additives include crosslinking agents, UV stabilizers, flame retardants, emulsifiers, compatibilizers, lubricants, antioxidants, colorants, and dyes.

A multilayered composite can be formed to generate a gas within an enclosure formed of the composite. Such a composite includes a gas-generating layer and a barrier layer. The gas-generating layer includes the powder. The barrier layer is adjacent to a surface of the gas-generating layer. The barrier layer is permeable to moisture such that it transmits the moisture to the gas-generating layer. However, the barrier layer is impermeable or only semipermeable to the gases generated and released by the gas-generating layer. The gas-generating layer, when exposed to moisture or relative humidity is capable of generating and releasing chlorine dioxide after activation.

Gas-releasing powders, films or other compositions of the invention can be used to retard, kill, prevent or control microbiological contamination or biochemical decomposition on a surface of a material, within the material or in the atmosphere surrounding the material by placing the material adjacent to the composition of the invention, and exposing the composition to moisture or relative humidity to release chlorine dioxide from the composition into the atmosphere surrounding the material. Microbiological contaminants can include bacteria, viruses, mold, and fungi.

The compositions can also be used to retard, prevent or control biological contamination of an atmosphere by exposing the composition to moisture or relative humidity to generate and release chlorine dioxide from the composition into the atmosphere surrounding the composition.

As used herein, retarding, preventing, or controlling biological contamination is also referred to as "sanitization," "disinfection" or "sterilization." Biological contamination can include bacteria, viruses such as corona viruses (e.g., SARS-COV-2 and variants thereof such as the Delta or Omicron variants), mold and fungi.

The compositions can also be used to retard, prevent or control biological contamination of a material by placing the material adjacent to the composition, and exposing the composition to moisture or relative humidity to generate and release chlorine dioxide from the composition into the atmosphere surrounding the material. Chlorine dioxide, for example, is used following biological warfare to deactivate the biological contaminant (e.g., anthrax) or for other military decontamination.

As an example, the powder or any composition containing the powder, such as a film, can be placed into a sealable bag or other container used in sterilizing medical devices, or into a "red bag" used in decontaminating or disinfecting medical waste or personal protective equipment such as masks, gowns and pants. Alternatively, the bag or container can be made from a film containing the powder of the invention. The chlorine dioxide released by the powder or composition is effective against SARS-COV-2 and variants thereof such as the Delta or Omicron variants.

The compositions can also be used to deodorize a surface of a material or the atmosphere surrounding the material or enhance freshness of the material by placing the material adjacent to the composition, and exposing the composition to moisture or relative humidity to generate and release chlorine dioxide from the composition into the atmosphere surrounding the material.

The compositions can also be used to retard, prevent, inhibit, or control chemotactic attraction of an organism to a material by placing the material adjacent to the composition, and exposing the composition to moisture or relative humidity to generate and release chlorine dioxide from the composition into the atmosphere surrounding the material.

In the above methods, the surface of the material or the entire material can be impregnated with a powder of the invention or coated with the composition, the composition can be admixed with the material, the composition can be enclosed within a gas-permeable container, or the material and the composition can be enclosed within a container. When the composition is enclosed within a container, the container can be hermetically sealed, or partially sealed such that some gas leaks from the container.

The chlorine dioxide-releasing powder, for example, can be impregnated into containers used to store food products, soap, laundry detergent, documents, clothing, paint, seeds, medical instruments, devices and supplies such as catheters and sutures, personal care products, medical or biological waste, athletic shoes, ostomy bags, footwear, and refuse. Such a powder can also be impregnated into covers for medical, hospital, home or commercial equipment or covers used in storage. A packet, sachet bag, "tea bag" or other gas-permeable container of the powder can be included in a storage container to provide a chlorine dioxide micro-atmosphere upon activation. The chlorine dioxide-releasing powder can also be impregnated into a paper or polymeric material (e.g., a shower mat, shoe inserts or insoles, bandage material, a meat cutting board, a food wrapper, a food packaging tray, a seed packet, or an air filter); incorporated into a wax or polymeric coating applied to paperboard containers or other surfaces; incorporated into films such as packaging films or covers for storage or medical, hospital, home or commercial equipment; formed into porous parts to sterilize water; admixed with a material to create a micro-atmosphere of chlorine dioxide about the material (e.g., soil); or admixed with other powders to kill microorganisms, enhance freshness or deodorize (e.g., foot powders, bath powders, powders for treating soft surfaces such as carpet powders, desiccants for moisture removal).

The powders can also be used to: neutralize malodors, retard, prevent, inhibit or control chemotaxis (i.e., the attraction of a living organism to a chemical substance); or reduce or eliminate bacteria in animal feed and potentially reduce the bacterial load in the intestines of an animal that consumes the feed.

The compositions of the invention effectively release a gas at temperatures generally encountered in the above uses, including refrigeration temperatures. The chlorine dioxide-releasing compositions, for example, can be used in packaging medical supplies, food or other materials that require refrigeration to sterilize or deodorize the materials. The multilayered films including a barrier layer can also be used to form packaging such as used for medical supplies or food. The barrier layer retains the generated gas within the packaging, for example, to enhance shelf life and prevent mold growth in foods or enhance sterilization of medical supplies.

Having described the invention in detail, it will be apparent that modifications and variations are possible without departing from the scope of the invention defined in the appended claims.

EXAMPLES

The following non-limiting examples are provided to illustrate the invention.

Example 1

Moisture activated powder was produced by a two-step spray drying process to create multi-layered particles with a size distribution of D10 0.79 microns; D50 13.24 microns; D90 30.99 microns.

Preparation of core powder. A liquid slurry was prepared in a blend tank to be spray dried to form a core powder. The blend tank had an agitator that was on during the addition of all of the ingredients.

First, the blend tank was filled with deionized water in an amount to provide 27.3% of a liquid slurry before spray drying. Sodium chlorite powder (2.7 wt. %) was added to the water, followed by sodium silicate (70 wt. %) to form a clear slurry with a slight yellow tint. The amounts recited are based on the total weight of the liquid slurry before it was spray-dried. The slurry was then transferred to the feed tank to the spray dryer, again fitted with an agitator.

About 22.8 kg (50 pounds) of the liquid slurry containing the dissolved sodium chlorite, and suspended sodium silicate was pumped into the spray dryer using a positive displacement pump. The absolute viscosity of the slurry containing 35.2% solids was 1.4 centipoise at 29° C. (85° F.) with a pH of 12.8. Inlet temperature of the spray dryer ranged from 510° C. (950° F.) to 527° C. (980° F.) over the course of the run. The outlet temperature ranged from 121° C. (250° F.) to 124° C. (255° F.). Powder was produced by spray drying the slurry.

The resulting fine, white hygroscopic powder was screened through a 50-micron mesh into a poly-barrel lined with two opaque plastic bags. A perforated hose connected to a nitrogen gas cylinder was inserted into the barrel to promote cooling. The bags and drum were sealed once the temperature decreased to 32° C. (90° F.).

Preparation of finished core-shell powder. A liquid slurry was prepared in a blend tank containing deionized water maintained at a temperature of 7.2° C. (45° F.). Sodium polyphosphate was added to the chilled water and agitated until dissolved. Magnesium sulfate was then added which resulted in a colloidal suspension with periodic build-up on the side walls of the blend tank, which was periodically removed from the side walls and redeposited in the mixture which had a pH of 6.

The core powder was then added and mixed with the colloidal suspension in the blend tank. This final slurry had a pH of 7 with the constituents by weight as follows: 77.3% distilled water, 6.4% sodium polyphosphate, 11% magnesium sulfate and 5.2% core powder. The final slurry was then transferred to the pump-off feed tank for pumping to the spray dryer. The absolute viscosity of the slurry containing 24.1% solids was 58.72 centipoise with a pH of 7.0. Inlet temperature of the spray dryer ranged from 510° C. (950° F.) to 527° C. (980° F.) over the course of the run. The outlet temperature ranged from 121° C. (250° F.) to 124° C. (255° F.). Powder was produced by spray drying the slurry.

The resulting fine, white powder having an average moisture content of 4.6% was screened through a 50-micron mesh into a poly-barrel lined with two opaque plastic bags. A perforated hose connected to a nitrogen gas cylinder was inserted into the barrel to promote cooling. The bags and drum (subject to nitrogen inert atmosphere) containing the final powder were sealed once the temperature decreased to 32° C. (90° F.).

Four samples of the finished powder were collected throughout the run and tested for chlorine dioxide production when exposed to a moisture-laden sponge. Production of more than 250 ppm chlorine dioxide was consistently observed after 60 seconds of exposure of 5 grams of powder to the moisture. Prolonged exposure to the moisture produced levels greater than 1,000 ppm of chlorine dioxide from the 5 grams of powder. All four samples produced the same results, i.e. production of more than 250 ppm chlorine dioxide after 60 seconds of exposure of 5 grams of powder to the moisture and within 20 minutes after exposure, greater than 1,000 ppm of chlorine dioxide was produced.

Example 2

Pellet Formation: The spray-dried powder of Example 1 is compounded into pellets using a range of polymers such as 2 to 20 melt index linear low-density polyethylene (LLDPE) resin at a concentration of 20% powder and 80% resin. The pellets are packaged under nitrogen and stored in a dry atmosphere.

Film Formation: The pellets are blown into film using a range of resins such as 2 to 20 melt index LLDPE resin (50% letdown). The resulting film contains about 10 wt. % of the powder. The film is stored in a dry atmosphere.

Moisture Activation of Film: A film sample is placed in a jar (including desiccant to create 0% relative humidity) with a 0-10 ppm chlorine dioxide electrochemical detector attached to the lid. No chlorine dioxide is generated during that time. Introduction of moisture, relative humidity or water causes generation of chlorine dioxide.

Definitions

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C—O)— groups, heterocyclic groups, cycloalkyl groups, amino groups, alkyl—and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

The term "alkyl," as used herein, refers to a linear, branched or cyclic hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons), and more preferably having 1 to 18 carbon atoms. Alkyl groups include, but are not limited to, methyl, ethyl, n-propyl, isopropyl, n-butyl, iso-butyl, secondary-butyl, and tertiary-butyl. Alkyl groups can be unsubstituted or substituted by one or more suitable substituents.

The term "alkenyl," as used herein, refers to a straight, branched or cyclic hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, more preferably having 1 to 18 carbon atoms, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups can be unsubstituted or substituted by one or more suitable substituents, as defined above.

The term "alkynyl," as used herein, refers to a straight, branched or cyclic hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, more preferably having 1 to 18 carbon atoms, and having one or more carbon-carbon triple bonds. Alkynyl groups include, but are not limited to, ethynyl, propynyl, and butynyl. Alkynyl groups can be unsubstituted or substituted by one or more suitable substituents, as defined above.

The term "aryl" or "ar," as used herein alone or as part of another group (e.g., aralkyl), means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above. The term "aryl" also includes heteroaryl.

"Arylalkyl" or "aralkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups can be unsubstituted or substituted by one or more suitable substituents, preferably 1 to 5 suitable substituents, as defined above.

The term "-ene" as used as a suffix as part of another group denotes a bivalent radical in which a hydrogen atom is removed from each of two terminal carbons of the group, or if the group is cyclic, from each of two different carbon atoms in the ring. For example, alkylene denotes a bivalent alkyl group such as ethylene (—CH2CH2—) or isopropylene (—CH2(CH3)CH2—). For clarity, addition of the -ene suffix is not intended to alter the definition of the principal word other than denoting a bivalent radical. Thus, continuing the example above, alkylene denotes an optionally substituted linear saturated bivalent hydrocarbon radical.

The term "ether" as used herein represents a bivalent (i.e., difunctional) group including at least one ether linkage (i.e., —O—).

The term "heteroaryl," as used herein, refers to a monocyclic, bicyclic, or tricyclic aromatic heterocyclic group containing one or more heteroatoms (e.g., 1 to 3 heteroatoms) selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2, 3-oxadiazolyl), thiadiazolyl (e.g., 1,3,4-thiadiazolyl), quinolyl, isoquinolyl, benzothienyl, benzofuryl, and indolyl. Heteroaryl groups can be unsubstituted or substituted by one or more suitable substituents, preferably 1 to 5 suitable substituents, as defined above.

The term "hydrocarbon" as used herein describes a compound or radical consisting exclusively of the elements carbon and hydrogen.

The term "substantially amorphous" is defined as including no more than 20% crystalline inclusions, preferably no more than 10%, and more preferably no more than 2%.

The term "substituted" means that in the group in question, at least one hydrogen atom bound to a carbon atom is replaced with one or more substituent groups such as hydroxy (—OH), alkylthio, phosphino, amido (—CON(RA)(RB), wherein RA and RB are independently hydrogen, alkyl, or aryl), amino(—N(RA)(RB), wherein RA and RB are independently hydrogen, alkyl, or aryl), halo (fluoro, chloro, bromo, or iodo), silyl, nitro (—NO2), an ether (—ORA wherein RA is alkyl or aryl), an ester (—OC(O)RA wherein RA is alkyl or aryl), keto (—C(O)RA wherein RA is alkyl or aryl), heterocyclo, and the like. When the term "substituted" introduces or follows a list of possible substituted groups, it is intended that the term apply to every member of that group. That is, the phrase "optionally substituted alkyl or aryl" is to be interpreted as "optionally substituted alkyl or optionally substituted aryl." Likewise, the phrase "alkyl or aryl optionally substituted with fluoride" is to be interpreted as "alkyl optionally substituted with fluoride or aryl optionally substituted with fluoride."

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A method of making a moisture-activated powder for providing controlled release of chlorine dioxide, the method comprising:

admixing sodium chlorite, a silicate, and water to form an aqueous suspension, the aqueous suspension including sodium chlorite of 85-99% purity; and spray-drying the aqueous suspension at an inlet temperature ranging from about 482 to about 537° C. (900 to 1000° F.) and an outlet temperature of not more than 143° C. (290° F.) to form silicate particles, admixing an inorganic acid-releasing agent, an anhydrous material, and water to form a colloidal suspension;

admixing the silicate particles with the colloidal suspension to form a slurry; and spray-drying the slurry at an inlet temperature ranging from about 482 to about 537° C. (900 to 1000° F.) and an outlet temperature of not more than 143° C. (290° F.) to form the powder, wherein the powder is substantially free of water and capable of generating and releasing chlorine dioxide in an amount effective for disinfection, without release of detectable amounts of chlorine gas, chlorates and/or chlorites, after hydrolysis of the acid releasing agent and reaction of hydronium ions with chlorite.

2. The method of claim 1, further comprising admixing a dispersant with the sodium chlorite, the silicate, and the water to form the aqueous suspension.

3. The method of claim 2, wherein the dispersant comprises a nonionic surfactant.

4. The method of claim 3, wherein the nonionic surfactant comprises a secondary alcohol ethoxylate, an alkylphenol ethoxylate, an alkyl ethoxylate, an alkyl aryl ethoxylate, a polyethylene oxide-polypropylene oxide block copolymer, a polyethylene glycol ether of a linear alcohol, a reaction product of a fatty acid with ethylene oxide and/or propylene oxide, polyvinyl alcohol, polyvinylpyrrolidone, a copolymer of polyvinyl alcohol and polyvinylpyrrolidone, a copolymer of (meth)acrylic acid and (meth)acrylic acid ester, or any combination thereof.

5. The method of claim 1, wherein the pH of the aqueous suspension is from about 9 to about 14.

6. The method of claim 1, wherein the pH of the colloidal suspension is from about 5 to about 7.

7. The method of claim 1, wherein the silicate comprises sodium silicate, sodium metasilicate, sodium sesquisilicate, sodium orthosilicate, a borosilicate, an aluminosilicate, magnesium silicate, calcium metasilicate, aluminum silicate, zinc silicate, or any combination thereof.

8. The method of claim 1, wherein the inorganic acid-releasing agent comprises a tetraalkyl ammonium polyphosphate, monobasic potassium phosphate, potassium polymetaphosphate, sodium metaphosphate, a borophosphate, an aluminophosphate, a silicophosphate, a sodium polyphosphate, potassium tripolyphosphate, sodium-potassium phosphate, or any combination thereof.

9. The method of claim 1, wherein the anhydrous material comprises sodium sulfate, calcium sulfate, calcium carbonate, magnesium sulfate, calcium chloride, moisture-depleted silica gel, alumina, a zeolite, a clay, potassium permanganate, a molecular sieve, or any combination thereof.

10. The method of claim 1, wherein the powder comprises from about 30 wt. % to about 80 wt. % of the anhydrous material, about 10 wt. % to about 50 wt. % of the inorganic acid-releasing agent, about 5 wt. % to about 40 wt. % of the silicate, and about 0.01 wt. % to about 50 wt. % sodium chlorite.

11. The method of claim 1, wherein the powder comprises from about 35 wt. % to about 70 wt. % of the anhydrous material, about 15 wt. % to about 45 wt. % of the inorganic acid-releasing agent, about 10 wt. % to about 35 wt. % of the silicate, and about 1 wt. % to about 30 wt. % sodium chlorite.

12. The method of claim 1, wherein the powder comprises from about 40 wt. % to about 60 wt. % of the anhydrous material, about 20 wt. % to about 40 wt. % of the inorganic acid-releasing agent, about 15 wt. % to about 30 wt. % of the silicate, and about 0.5 wt. % to about 5 wt. % sodium chlorite.

13. The method of claim 1, wherein the aqueous suspension is an azeotrope.

14. The method of claim 13, wherein the azeotrope in the aqueous suspension comprises acetone, acetonitrile, acrylonitrile, an alcohol, an alkenol, an alkane, an alkenal, a haloalkane, aniline, a cycloalkane, benzene, an alkylbenzene, a halobenzene, carbon disulfide, carbon tetrachloride, chloroform, epichlorohydrin, an alkylamine, a dialkylamine, an alkyl halide, an alkyl ether, an alkyl acetate, a haloalkene, an alkenyl chloride, toluene, or xylene.

15. The method of claim 13, wherein the azeotrope comprises acetone and one or more solvents comprising ethanol, methanol, isopropanol, tert-butanol, hexane, 2-methylpentane, dichloromethane, trichlorotrifluoroethane, nitromethane, cyclopentane, cyclohexane, carbon disulfide, carbon tetrachloride, chloroform, methyl iodide, ethyl iodide, isopropyl ether, methyl acetate, or trifluoroacetic acid.

16. The method of claim 1, wherein the amount effective for disinfection ranges from about 0.08 ppm/minute to about 50 ppm/minute over a period of about 2 to about 72 hours.

17. The method of claim 1, further comprising cooling the powder and/or packaging the powder under an inert atmosphere.

* * * * *